US012722477B2

(12) United States Patent
Kim et al.

(10) Patent No.: US 12,722,477 B2
(45) Date of Patent: Sep. 1, 2026

(54) CHARGING PORT OPENING AND CLOSING APPARATUS FOR VEHICLES

(71) Applicant: HYUNDAI MOBIS CO., LTD., Seoul (KR)

(72) Inventors: Jang Ho Kim, Yongin-si (KR); Jae Sup Byun, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 437 days.

(21) Appl. No.: 18/534,158

(22) Filed: Dec. 8, 2023

(65) Prior Publication Data

US 2025/0050728 A1 Feb. 13, 2025

(30) Foreign Application Priority Data

Aug. 8, 2023 (KR) ........................ 10-2023-0103359

(51) Int. Cl.
*B60K 15/05* (2006.01)
*B60L 53/16* (2019.01)

(52) U.S. Cl.
CPC .............. *B60K 15/05* (2013.01); *B60L 53/16* (2019.02); *B60K 2015/053* (2013.01)

(58) Field of Classification Search
CPC ............ B60K 15/05; B60K 2015/0515; B60K 2015/053; B60K 2015/0538; B60L 53/16
USPC ....................................................... 296/97.22
See application file for complete search history.

(56) References Cited

U.S. PATENT DOCUMENTS 10,912,914 B2 * 2/2021 Bexson ............... A61M 16/186
2016/0068064 A1 * 3/2016 Park ....................... B60K 15/05
296/97.22
2024/0337144 A1 * 10/2024 Och ........................ B60L 53/16

FOREIGN PATENT DOCUMENTS

JP 2014060886 A * 4/2014

* cited by examiner

*Primary Examiner* — Jason S Daniels
(74) *Attorney, Agent, or Firm* — MORGAN, LEWIS & BOCKIUS LLP

(57) ABSTRACT

The present invention relates to a charging port opening and closing apparatus for vehicles capable of opening and closing a fast part of a charging port without direct contact of a user's body with the charging port. The charging port opening and closing apparatus for vehicles for opening and closing the charging port coupled to a charging gun includes a door unit including a first door and a second door disposed in front of the charging port, a trigger unit including a trigger disposed at a position penetrating the first door and the second door, a link unit coupled to the first door and the second door and pushing or pulling the first door and the second door while being rotated, and a conversion unit connecting the trigger and the link unit and rotating the link unit while being rotated in conjunction with movement of the trigger.

8 Claims, 10 Drawing Sheets

CHARGING PORT OPENING AND CLOSING APPARATUS FOR VEHICLES

CROSS-REFERENCE TO RELATED APPLICATION

This application claims priority to and the benefit of Korean Patent Application No. 10-2023-0103359, filed on Aug. 8, 2023, the disclosure of which is incorporated herein by reference in its entirety.

BACKGROUND

1. Field of the Invention

The present invention relates to a charging port opening and closing apparatus for vehicles.

2. Discussion of Related Art

In vehicles, a refueling port is a portion through which fuel is injected from an external refueling device, and in particular, in electric vehicles (EV), a charging port to be coupled to a charging gun is disposed.

In the charging port, a slow part for slow charging and a fast part for fast charging are formed, and in general, in preparation for charging a vehicle battery using only the slow part, the fast part is covered with a dust cap made of rubber or plastic.

Therefore, when using the fast part of the charging port, it is inconvenient for a user to personally remove the dust cap and then insert the charging gun into the charging port. In addition, since the dust cap is kept in a state where foreign substances such as dust generated during traveling of a vehicle are stained, there is a problem that the user has to personally attach and detach the dirty dust cap to use the fast part.

Accordingly, there is an increasing need for an apparatus capable of opening and closing the fast part of the charging port without direct contact of a user's body with the charging port by replacing the dust cap.

SUMMARY OF THE INVENTION

The present invention is directed to providing a charging port opening and closing apparatus for vehicles capable of opening and closing a fast part of a charging port without direct contact of a user's body with the charging port.

According to an aspect of the present invention, there is provided a charging port opening and closing apparatus for vehicles for opening and closing a charging port coupled to a charging gun, the apparatus including a door unit including a first door and a second door disposed in front of the charging port, a trigger unit including a trigger disposed at a position penetrating the first door and the second door, a link unit coupled to the first door and the second door and pushing or pulling the first door and the second door while being rotated, and a conversion unit connecting the trigger and the link unit and rotating the link unit while being rotated in conjunction with movement of the trigger.

The conversion unit may include a moving block moved together with the trigger, a rotating shaft rotated in place, and a connector rotatably coupled to the moving block and engaged with the rotating shaft.

The connector may be movable along an axial direction of the rotating shaft.

The charging port opening and closing apparatus for vehicles may include a cable housing in which the charging port is disposed, and the door unit may include a guide plate coupled to the cable housing and movably supporting the first door and the second door.

The cable housing may include a first groove for accommodating a portion of the trigger, the first door may include a second groove, the second door may include a third groove, and the first groove, the second groove, and the third groove may be disposed on a movement path of the trigger.

The moving block may include a first block part coupled to the trigger and a second block part having a shape bent from an end of the first block part and rotatably supporting the connector.

The link unit may include a first link coupled to the rotating shaft of the conversion unit and a second link connecting the first link and the first door and connecting the first link and the second door.

The charging port opening and closing apparatus for vehicles may include an elastic member disposed inside the trigger and compressed or decompressed according to movement of the trigger, and the first door and the second door may close the charging port when a compressed state of the elastic member is released.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIGS. 5A to 5C are views illustrating a process in which the first door, the second door, a first link, and a second link are moved.

DETAILED DESCRIPTION OF EXEMPLARY EMBODIMENTS

Figure 1:
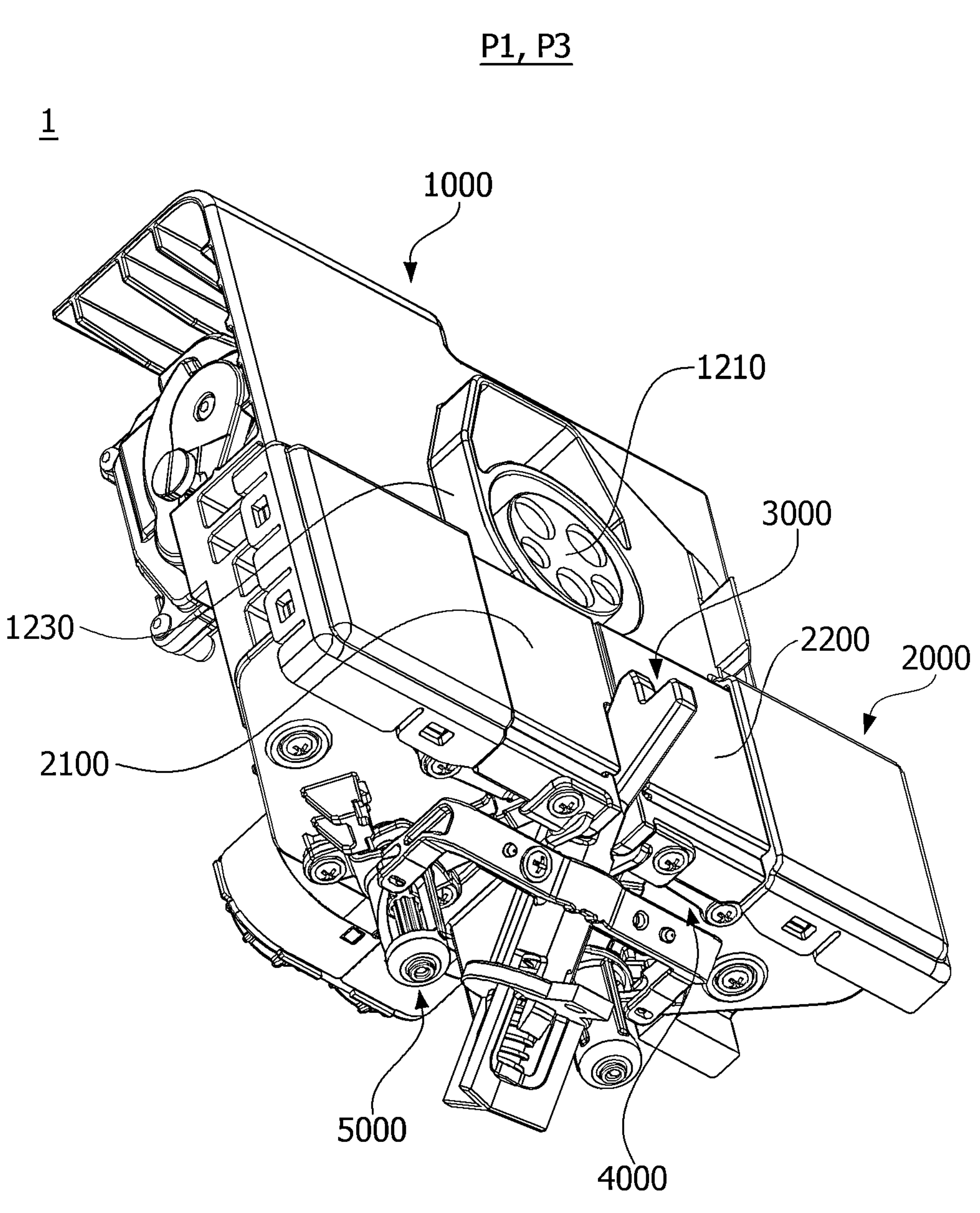
FIG. 1 is a perspective view of a charging port opening and closing apparatus for vehicles according to one embodiment of the present invention.

Since the present invention may be variously modified and embodied, particular embodiments thereof will be illustrated in the drawings and described. However, this is not intended to limit the present invention to the specific embodiments, and it should be understood to include all modifications, equivalents, and substitutes included in the spirit and scope of the present invention.

Although the terms including ordinal numbers such as first, second, or the like, may be used to describe various elements, these elements are not limited by these terms. These terms are only used to distinguish one element from another element. For example, without departing from the scope of the present invention, a second element could be called a first element, and similarly, a first element could be called a second element. The term "and/or" includes a combination of a plurality of related listed items or any of a plurality of related listed items.

It will be understood that when an element is referred to as being "coupled" or "connected" to another element, the element may be directly coupled or connected to the other element, or intervening elements may also be present. In contrast, it will be understood that when an element is referred to as being "directly coupled" or "directly connected" to another element, there are not intervening elements present.

In the description of embodiments, when one element is described as being formed "on" or "under" another element, "on" or "under" includes both a case in which the two elements are directly in contact with each other and a case in which at least one additional element is formed to be disposed between the two elements (indirectly). Further, when expressed as "on or under", the expression may include the meaning of not only an upward direction but also a downward direction based on one element.

The terms used in the present application are merely provided to describe specific embodiments, and are not intended to limit the present invention. The singular forms are intended to include the plural forms as well, unless the context clearly indicates otherwise. In the present application, it will be further understood that the terms "includes" and/or "have", when used in this specification, specify the presence of stated features, integers, steps, operations, elements, components, and/or combinations thereof, but do not preclude the possibility of the presence or addition of one or more other features, integers, steps, operations, elements, components, or combinations thereof.

Unless otherwise defined, all terms used herein, including technical or scientific terms, have the same meaning as commonly understood by those of ordinary skill in the art to which the present invention belong. Terms, such as those defined in commonly used dictionaries, should be interpreted as having a meaning that is consistent with their meaning in the context of the related art and will not be interpreted in an idealized or overly formal sense unless expressly so defined herein.

Hereinafter, a charging port opening and closing apparatus for vehicles will be described in detail with reference to the accompanying drawings, but identical or corresponding components are denoted by the same reference numerals regardless of figure numbers, and redundant descriptions thereof will be omitted.

Figure 2:
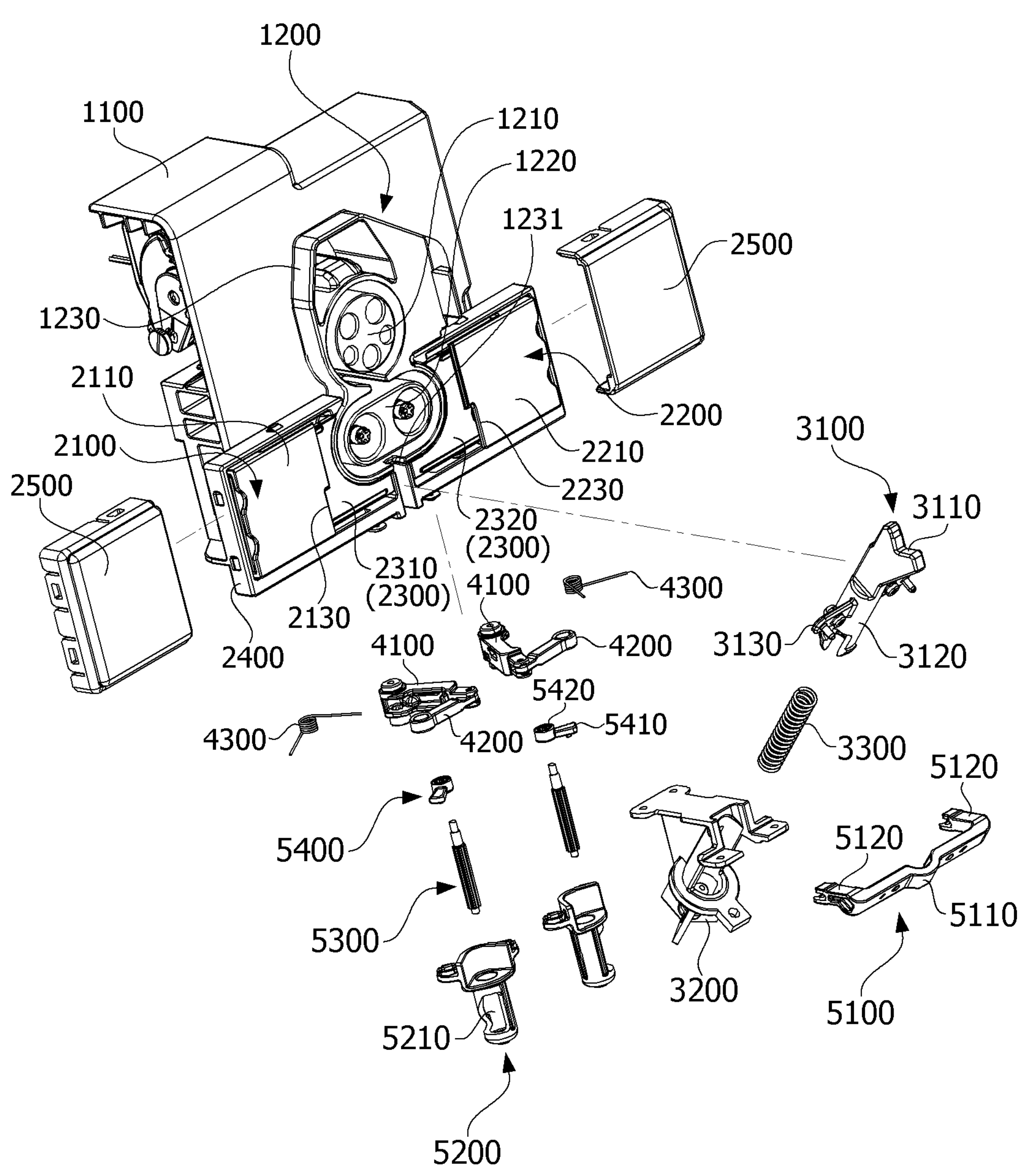
FIG. 2 is an exploded perspective view of the charging port opening and closing apparatus for vehicles according to one embodiment of the present invention.
Figure 3:
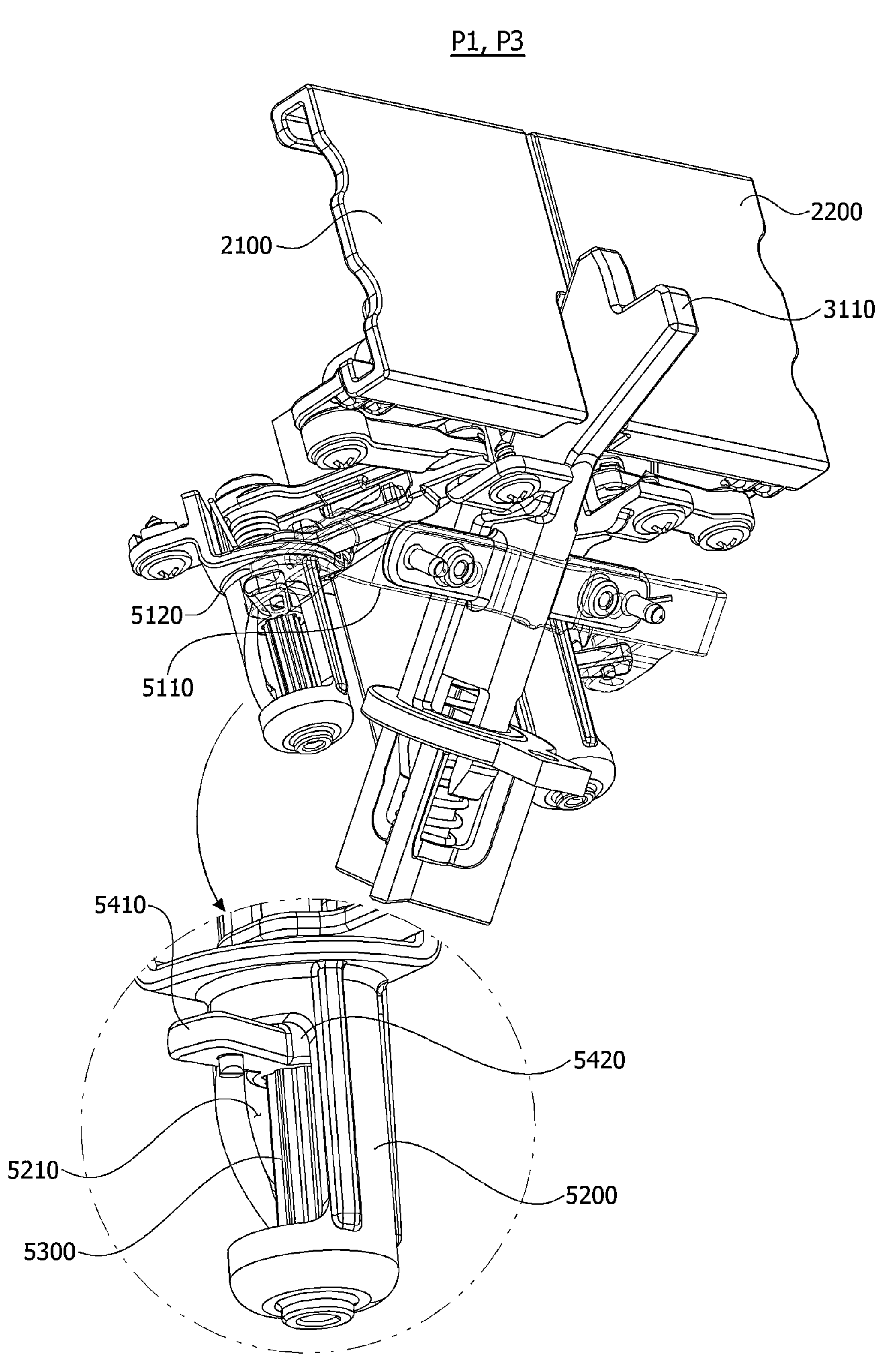
FIG. 3 is a view illustrating the charging port opening and closing apparatus for vehicles excluding a cable housing.
Figure 4:
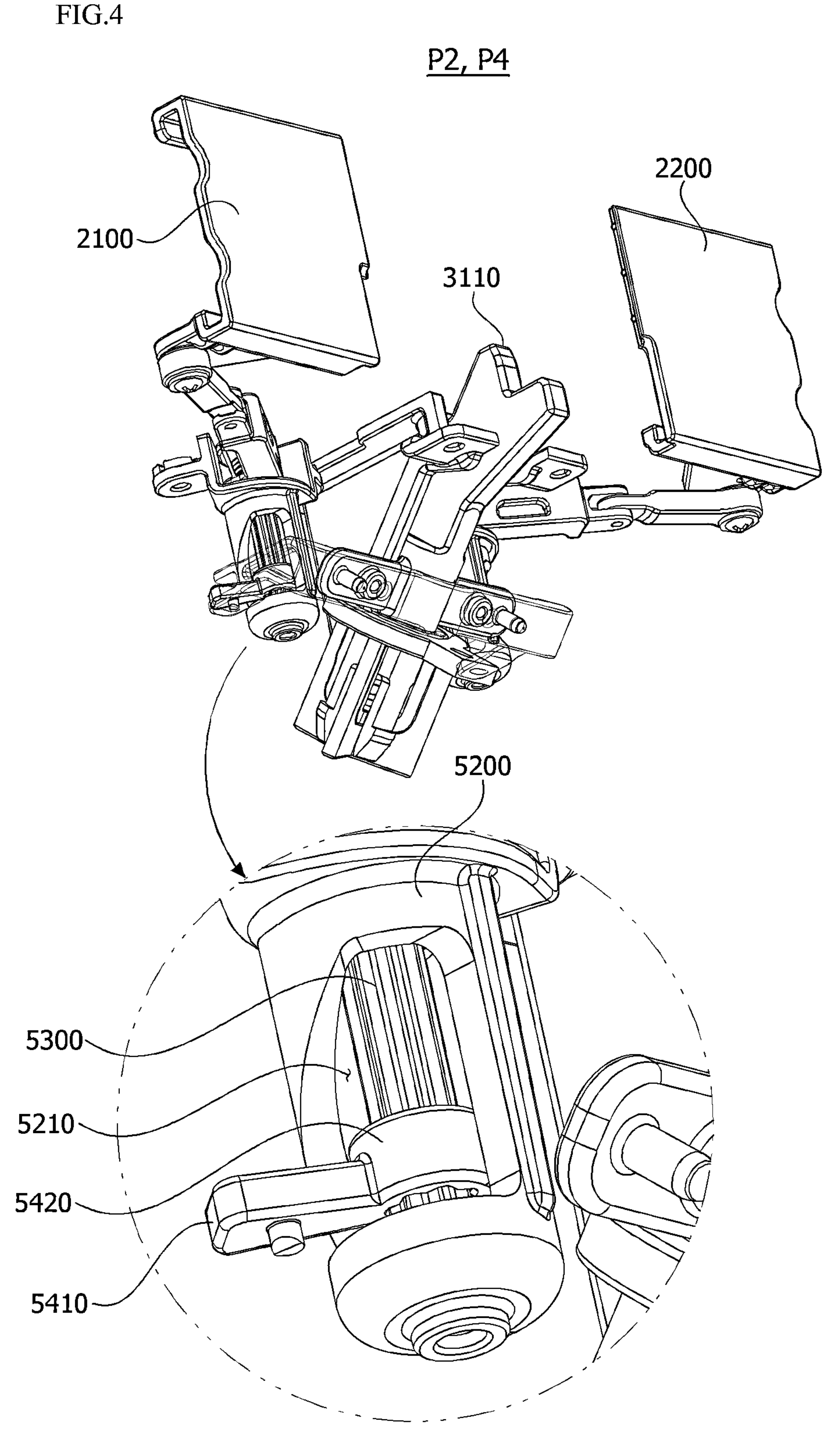
FIG. 4 is a view illustrating a state where a first door and a second door are disposed in a second position.
Figure 5A:
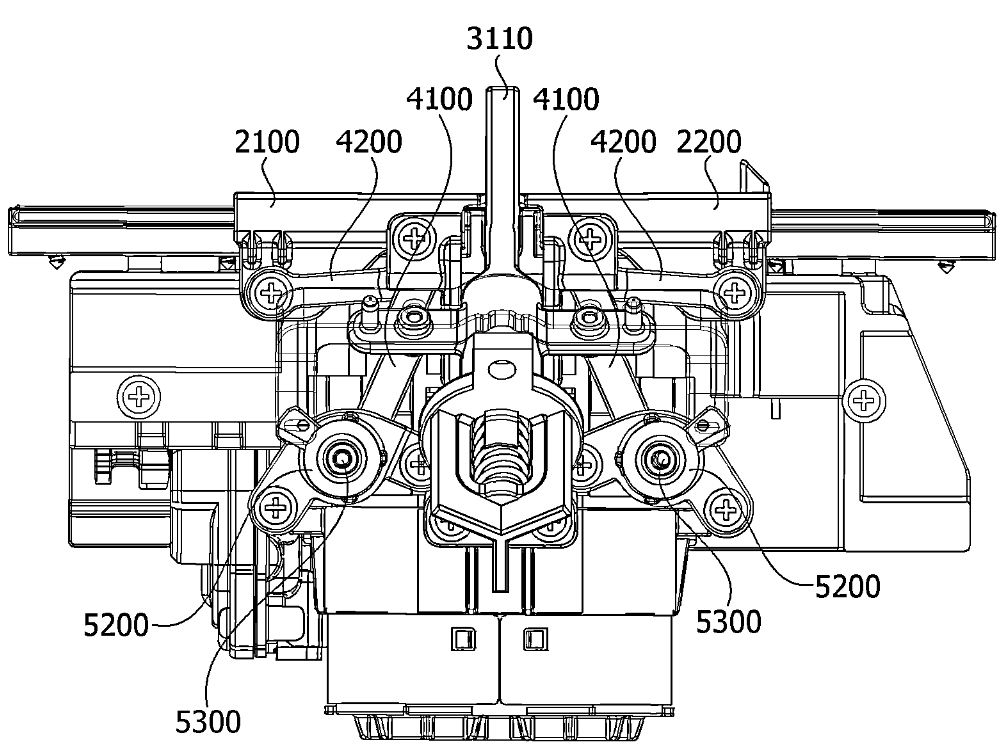
Figure 5B:
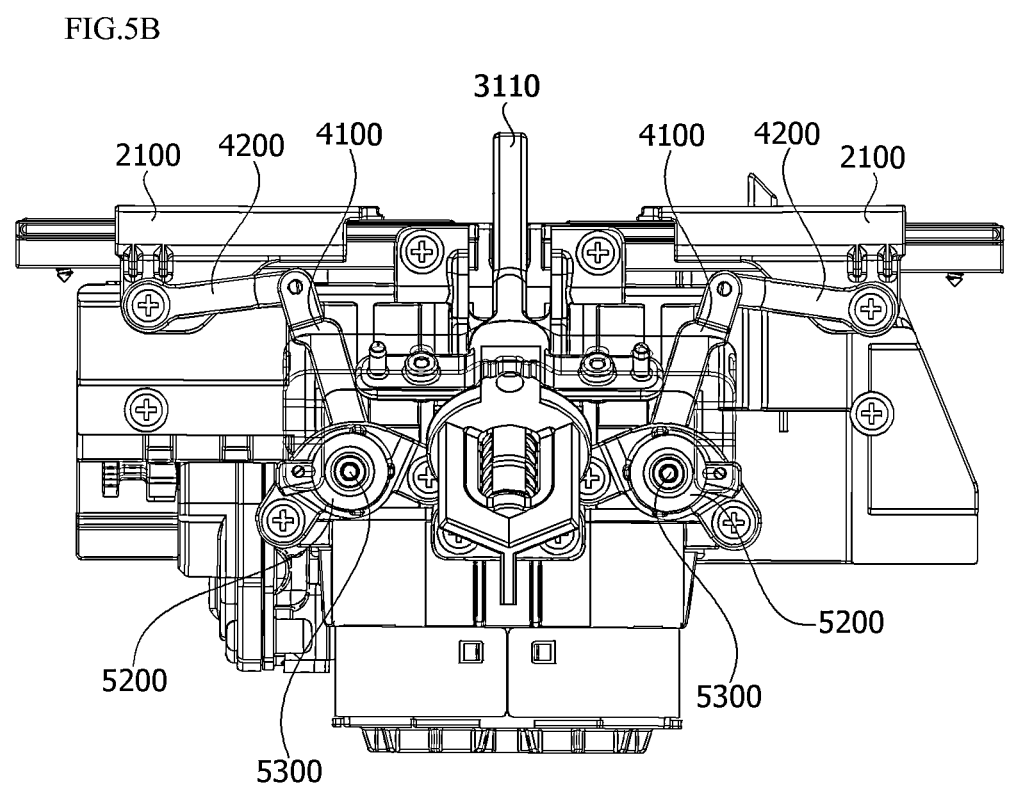
Figure 5C:
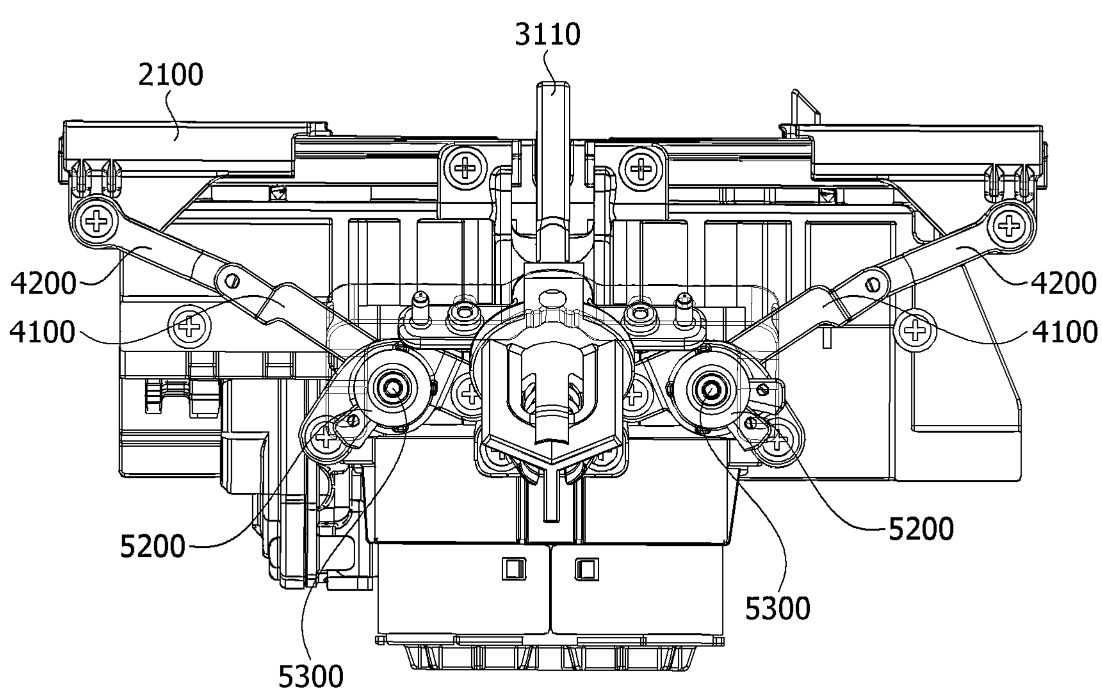
Figure 6:
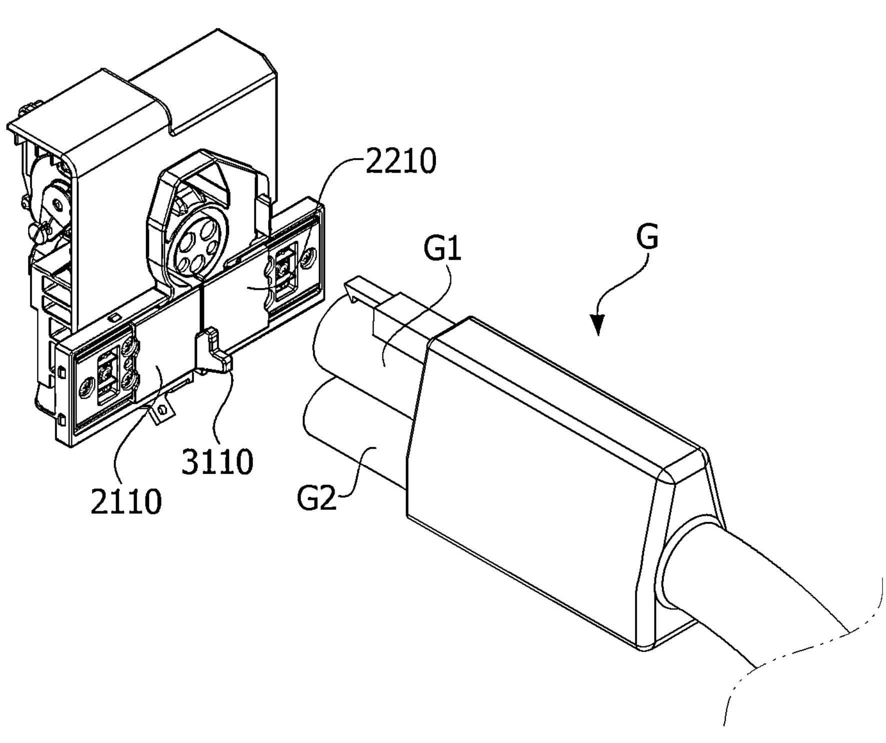
FIGS. 6 to 8 are views illustrating a process in which a charging gun is coupled to a charging port.
Figure 7:
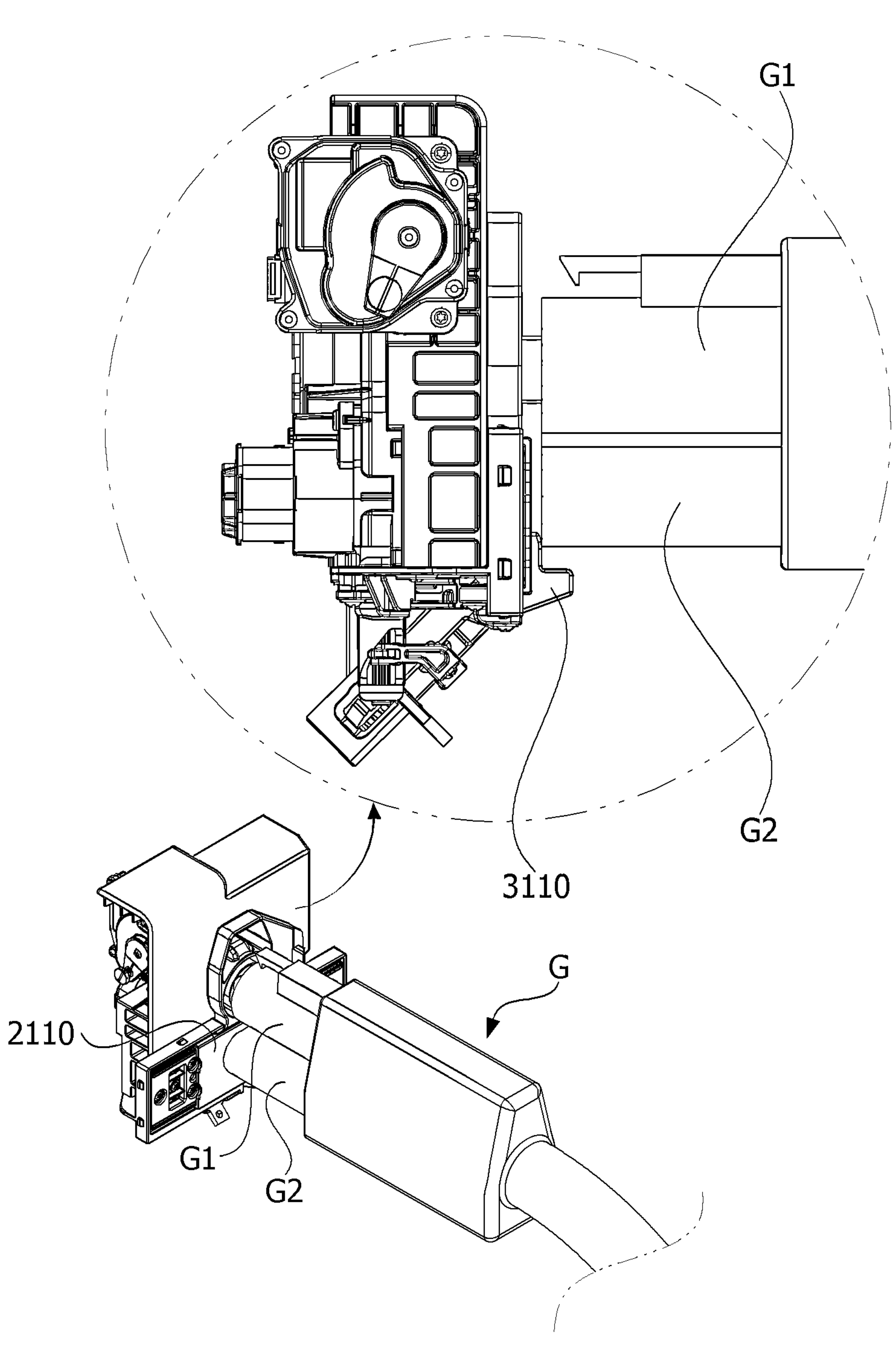
Figure 8:
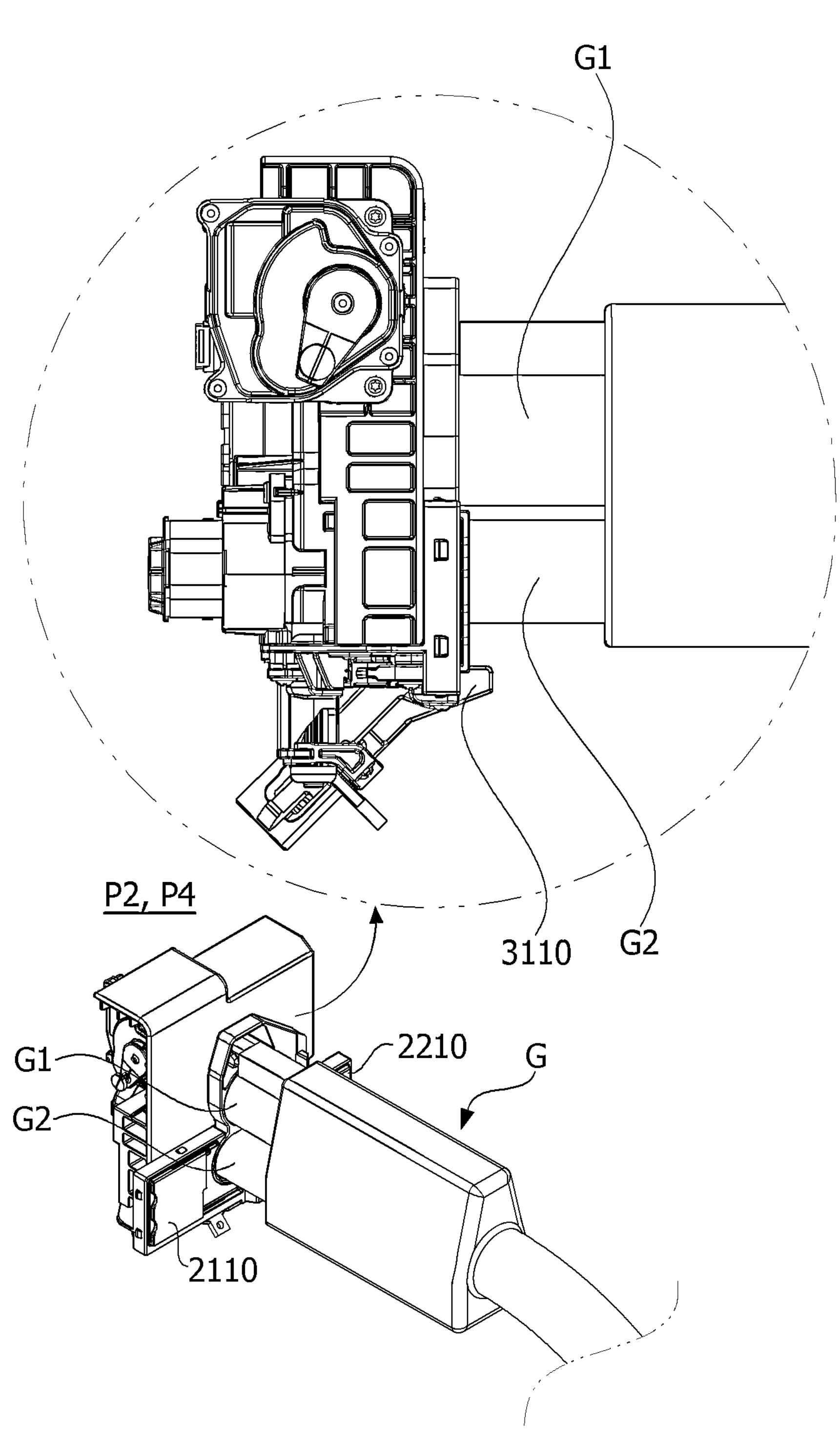

FIG. 1 is a perspective view of a charging port opening and closing apparatus for vehicles according to one embodiment of the present invention, FIG. 2 is an exploded perspective view of the charging port opening and closing apparatus for vehicles according to one embodiment of the present invention, FIG. 3 is a view illustrating the charging port opening and closing apparatus for vehicles excluding a cable housing, FIG. 4 is a view illustrating a state where a first door and a second door are disposed in a second position, FIGS. 5A to 5C are views illustrating a process in which the first door, the second door, a first link, and a second link are moved, and FIGS. 6 to 8 are views illustrating a process in which a charging gun is coupled to a charging port.

Referring to FIGS. 1 to 5C, a charging port opening and closing apparatus 1 for vehicles according to one embodiment of the present invention may be disposed inside a vehicle door. More specifically, the charging port opening and closing apparatus 1 for vehicles is disposed inside a charging port door of an electric vehicle and is configured to be exposed to the outside of the vehicle when the charging port door is opened. The charging port opening and closing apparatus 1 for vehicles includes a cable housing 1000, a door unit 2000, a trigger unit 3000, a link unit 4000, and a conversion unit 5000.

The cable housing 1000 may be coupled with a charging cable (not illustrated) coupled to a charging gun G to support the charging cable. The cable housing 1000 may be coupled to a vehicle body. The cable housing 1000 may include a first housing body 1100 and a charging port 1200.

The first housing body 1100 may form an exterior of the cable housing 1000. The first housing body 1100 may be provided in a hollow shape to accommodate a charging cable. A plurality of protrusions for fixing a portion of a second elastic member 4300 to be described below may be formed on the first housing body 1100.

The charging port 1200 may be provided integrally with the first housing body 1100. The charging port 1200 may be coupled to a charging cable installed inside the vehicle to support the charging cable. The charging port 1200 may include a slow part 1210, a fast part 1220 and a port cover part 1230. Here, the charging gun G may include a first pin part G1 coupled to the slow part 1210 and a second pin part G2 coupled to the fast part 1220.

The slow part 1210 may receive the first pin part G1 of the charging gun G. The fast part 1220 may be disposed below the slow part 1210 along a direction from the slow part 1210 toward the fast part 1220, thereby receiving the second pin part G2 of the charging gun G. The fast part 1220 may have a rectangular edge. The port cover part 1230 may be disposed outside the slow part 1210 and the fast part 1220 so that an entry space for the charging gun G is formed between the slow part 1210 and the fast part 1220.

The port cover part 1230 may include a first groove 1231. The first groove 1231 may be disposed between two receivers of the fast part 1220 for receiving the second pin part G2 of the charging gun Gin the port cover part 1230. The first groove 1231 may be disposed on a movement path of a trigger 3100 rotated by the charging gun G, which will be described below. The first groove 1231 may movably accommodate a portion of the trigger 3100.

The door unit 2000 may be disposed in front of the cable housing 1000 along a direction perpendicular to the direction from the slow part 1210 of the charging port 1200 toward the fast part 1220 thereof. The door unit 2000 may include a first door 2100 and a second door 2200 disposed in front of the charging port 1200.

The first door 2100 may include a first door body 2110, a first coupling part 2120, and a second groove 2130.

The first door body 2110 may cover any one of the two receivers of the fast part 1220 of the charging port 1200. The first door body 2110 may form the exterior of the first door 2100. The first door body 2110 may move to open or close any one of the two receivers of the fast part 1220 of the charging port 1200.

The first coupling part 2120 may have a shape protruding from a portion of the first door body 2110. The first coupling part 2120 may have a shape bent from the first door body 2110. The first coupling part 2120 may be coupled to a second link 4200 to be described below. The first coupling part 2120 coupled to the second link 4200 may be moved in conjunction with movement of the second link 4200.

The second groove 2130 may be formed in a portion of the first door body 2110 that comes into contact with the second door body 2210. The second groove 2130 may be disposed on a movement path of the trigger 3100 in the first door body 2110. A portion of the trigger 3100 may pass through the second groove 2130.

The second door 2200 may include a second door body 2210, a second coupling part 2220, and a third groove 2230.

The second door body 2210 may cover the other of the two receivers of the fast part 1220 of the charging port 1200, except for the receiver covered by the first door body 2110. The second door body 2210 may form the exterior of the second door 2200. The second door body 2210 may move to open or close any one of the two receivers of the fast part 1220 of the charging port 1200. The second door body 2210 may be provided in a shape that is symmetrical to that of the first door body 2110.

Each of the first door 2100 and the second door 2200 as described above may be disposed at a first position P1 and a second position P2. When the first door 2100 and the second door 2200 are disposed at the first position P1, the fast part 1220 of the charging port 1200 may be closed. In addition, when the first door 2100 and the second door 2200 are disposed at the second position P2, the fast part 1220 of the charging port 1200 may be opened. The first door 2100 and the second door 2200 may be moved in a space between the first position P1 and the second position P2.

The second coupling part 2220 may have a shape protruding from a portion of the second door body 2210. The second coupling part 2220 may have a shape bent from the second door body 2210. The second coupling part 2220 may be coupled to the second link 4200 to be described below. The second coupling part 2220 coupled to the second link 4200 may be moved in conjunction with the movement of the second link 4200.

The third groove 2230 may be formed in a portion of the second door body 2210 that comes into contact with the first door body 2110. The third groove 2230 may be disposed on the movement path of the trigger 3100 in the second door body 2210. A portion of the trigger 3100 may pass through the third groove 2230. In a state where the first door body 2110 and the second door body 2210 are in contact with each other, the third groove 2230 may be connected to the second groove 2130. The third groove 2230 may have a shape that is symmetrical to that of the second groove 2130.

The first groove 1231 of the cable housing 1000, the second groove 2130 of the first door 2100, and the third groove 2230 of the second door 2200 may be disposed on the movement path of the trigger 3100. Therefore, the trigger 3100 pressed by the charging gun G does not interfere with the movement path of the charging gun G, so that the charging gun G may be stably coupled to the charging port 1200. Thus, ease of operation of the charging gun G may be ensured.

In addition, the door unit 2000 may include a guide plate 2300, a guide case 2400, and a door cover 2500.

The guide plate 2300 may be coupled to the cable housing 1000 and movably support the first door 2100 and the second door 2200. The guide plate 2300 may include a first plate 2310 and a second plate 2320.

The first plate 2310 may be disposed to face the first door 2100 disposed at the first position P1. The first plate 2310 may wrap one region of the port cover part 1230 of the cable housing 1000. More specifically, the first plate 2310 may be disposed outside the fast part 1220 in the port cover part 1230. A guide protrusion may be formed on the first plate 2310 to guide a moving direction of the first door 2100.

The second plate 2320 may be disposed to face the second door 2200 disposed at the first position P1. The second plate 2320 may wrap one region of the port cover part 1230 of the cable housing 1000. More specifically, the second plate 2320 may be disposed outside the fast part 1220 in the port cover part 1230. A guide protrusion may be formed on the second plate 2320 to guide a moving direction of the second door 2200. The second plate 2320 may have a shape that is symmetrical to that of the first plate 2310.

The guide case 2400 may be disposed outside the guide plate 2300. The guide case 2400 may be coupled to the first housing body 1100 of the cable housing 1000. The guide case 2400 may have a larger size than the first plate 2310 and the second plate 2320 of the guide plate 2300. In addition, the guide case 2400 may have a larger size than the first door body 2110 of the first door 2100 and the second door body 2210 of the second door 2200. Accordingly, the guide case 2400 may serve as a stopper to block excessive movement of the first door 2100 and the second door 2200 to prevent the first door 2100 and the second door 2200 moved along the guide plate 2300 from escaping to the outside of the guide plate 2300. In addition, a separate groove that is connected to the first groove 1231 of the port cover part 1230 of the cable housing 1000 and accommodates a portion of the trigger unit 3000 may be formed in the guide case 2400.

The door cover 2500 may be coupled to the guide case 2400. The door cover 2500 may cover one region of the guide plate 2300 and the guide case 2400. The door cover 2500 may be moved along the guide plate 2300 to accommodate the first door 2100 and the second door 2200 in an open state of the fast part 1220 of the charging port 1200 therein.

The trigger unit 3000 may be disposed at a position penetrating the first door 2100 and the second door 2200. The trigger unit 3000 may include the trigger 3100, a cylinder 3200, and a first elastic member 3300.

The trigger 3100 may be configured to be moved by the charging gun G, so that the trigger 3100 is exposed to the user together with the first door 2100 and the second door 2200 when the door of the charging port 1200 is opened. The trigger 3100 may include a contact part 3110, a moving part 3120, and a third coupling part 3130.

The contact part 3110 may be a part of the trigger 3100 that contacts the charging gun G, and thereby disposed at a position penetrating the first groove 1231 of the cable housing 1000, the second groove 2130 of the first door 2100, and the third groove 2230 of the second door 2200. The contact part 3110 may pass through the second groove 2130 and the third groove 2230 and protrude outside the first door 2100 and the second door 2200. One region of the contact part 3110 may be formed to be concave toward the inside. This means that even if a phenomenon in which the charging gun G pressing the contact part 3110 slips in the process of being coupled to the charging port 1200 occurs, the contact part 3110 may support the charging gun G so that the charging gun G is prevented from escaping. Therefore, coupling stability of the charging gun G may be secured through the contact part 3110.

The moving part 3120 may extend from the contact part 3110. The moving part 3120 may be movably disposed on the cylinder 3200. The moving part 3120 may be moved together with the contact part 3110 when the contact part 3110 is pressed by the charging gun G. In addition, the moving part 3120 may have a hollow shape to accommodate the first elastic member 3300.

A plurality of third coupling parts 3130 may be formed in the moving part 3120. The plurality of third coupling parts 3130 may be disposed in one region and the other region of the moving part 3120, and the plurality of third coupling parts 3130 may be arranged side by side. The third coupling part 3130 may be configured to be disposed outside the cylinder 3200 so that the third coupling part 3130 is coupled to a moving block 5100 of the conversion unit 5000 to be described below. When the third coupling part 3130 is moved, the moving block 5100 may be moved along the third coupling part 3130.

The trigger 3100 may be disposed at each of a third position P3 and a fourth position P4. In a state where the charging gun G does not press the contact part 3110, the trigger 3100 may be disposed at the third position P3 where the contact part 3110 protrudes outside the first door 2100 and the second door 2200. In addition, in a state where the charging gun G is coupled to the charging port 1200 by pressing the contact part 3110, the trigger 3100 may be disposed at a fourth position P4 where the pressed state by the charging gun G is maintained.

The cylinder 3200 may be coupled to the guide case 2400 of the door unit 2000. The cylinder 3200 may accommodate the moving part 3120 of the trigger 3100 and the first elastic member 3300 therein. More specifically, since the cylinder 3200 has a hollow shape, the moving part 3120 of the trigger 3100 may be movably accommodated in the cylinder 3200. In addition, a protrusion for supporting the first elastic member 3300 may be formed in the cylinder 3200 to help compress and decompress the first elastic member 3300.

The first elastic member 3300 may be disposed inside the cylinder 3200. More specifically, the first elastic member 3300 may be coupled to a protrusion formed on the cylinder 3200. In addition, the first elastic member 3300 may be disposed inside the moving part 3120 of the trigger 3100 in a state of being disposed in the cylinder 3200. The first elastic member 3300 may be a pressing spring. The first elastic member 3300 may be compressed or decompressed according to the movement of the trigger 3100.

The link unit 4000 may be coupled to the first door 2100 and the second door 2200 and push or pull the first door 2100 and the second door 2200 while being rotated. The link unit 4000 may include a first link 4100, a second link 4200, and a second elastic member 4300.

The first link 4100 may be coupled to a rotating shaft 5300 of the conversion unit 5000 to be described below. When the rotating shaft 5300 is rotated, the first link 4100 may be rotated together with the rotating shaft 5300. A plurality of first links 4100 may be provided, and the plurality of first links 4100 may be disposed on one side and the other side of the trigger 3100, respectively. A groove for accommodating the second elastic member 4300 therein may be formed in the first link 4100.

The second link 4200 may connect the first link 4100 and the first door 2100. Further, the second link 4200 may connect the first link 4100 and the second door 2200. That is, a plurality of second links 4200 are also provided similarly to the first links 4100, and the plurality of second links 4200 may be disposed on one side and the other side of the trigger 3100, respectively. The second link 4200 may be coupled to the first coupling part 2120 of the first door 2100, and may be coupled to the second coupling part 2220 of the second door 2200.

The second link 4200 may be moved in conjunction with the movement of the first link 4100. More specifically, when the first link 4100 is rotated away from the trigger 3100, the second link 4200 may move the first door 2100 and the second door 2200 while being moved together with the first link 4100. At this time, the first door 2100 and the second door 2200 may be moved in different directions to open the fast part 1220 of the cable housing 1000 and disposed at the second position P2. Conversely, when the first link 4100 is rotated to approach the trigger 3100, the first door 2100 and the second door 2200 may be moved in different directions to close the fast part 1220 of the cable housing 1000 and disposed at the first position P1. That is, the second link 4200 may be configured to directly move the first door 2100 and the second door 2200.

The second elastic member 4300 may be disposed on each of the first links 4100. The second elastic member 4300 may be a torsion spring constituted by combining a winding part having a rolled winding shape and a protrusion protruding in a straight line in a normal direction from one end and the other end of the winding part.

When a compressed state of the second elastic member 4300 is released, the first door 2100 and the second door 2200 may close the charging port 1200. More specifically, when a pressed state of the trigger 3100 is released, the second elastic member 4300 may help return rotation of the first link 4100 rotated to be moved away from the trigger 3100 while being elastically restored. That is, the second elastic member 4300 may serve to indirectly assist the return movement when the first door 2100 and the second door 2200 disposed at the second position P2 are returned to be disposed at the first position P1. This means that the movement of the first door 2100 and the second door 2200 for closing the fast part 1220 of the charging port 1200 may be performed by a simple movement of separating the charging gun G from the trigger 3100 rather than by a user's manual operation. Therefore, since the user's need to directly touch the first door 2100 and the second door 2200 for manipulating the charging gun G through the second elastic member 4300 is eliminated, the user's hygiene safety may be secured.

The conversion unit 5000 may connect the trigger 3100 and the link unit 4000 and rotate the link unit 4000 while being rotated in conjunction with the movement of the trigger 3100. The conversion unit 5000 may include the moving block 5100, a second housing body 5200, the rotating shaft 5300, and a connector 5400.

The moving block 5100 may be moved together with the trigger 3100. The moving block 5100 may include a first block part 5110 and a second block part 5120.

The first block part 5110 may be coupled to the trigger 3100. More specifically, the first block part 5110 may be coupled to the third coupling part 3130 of the trigger 3100. The first block part 5110 may support the second block part 5120. The first block part 5110 may be moved together with the moving part 3120 of the trigger 3100.

The second block part 5120 may have a shape bent from an end of the first block part 5110 and rotatably support the connector 5400. The second block part 5120 may protrude from both ends of the first block part 5110. The second block part 5120 may have a hollow shape to support a portion of the connector 5400.

The second housing body 5200 may be coupled to the guide case 2400 of the door unit 2000. The second housing body 5200 may have a hollow shape to accommodate the rotating shaft 5300. The second housing body 5200 may include an exposure hole 5210 having a shape in which one region is open for a space in which the connector 5400 may be rotated. The rotating shaft 5300 disposed inside the second housing body 5200 may be exposed to the outside of the second housing body 5200 through the exposure hole 5210.

The rotating shaft 5300 may be disposed inside the second housing body 5200. The rotating shaft 5300 may be rotatably coupled to the second housing body 5200. The rotating shaft 5300 coupled to the second housing body 5200 may be rotated in place. A concavo-convex part having a gear tooth shape may be formed on an outer surface of the rotating shaft 5300.

The connector 5400 may be rotatably coupled to the moving block 5100 and engaged with the rotating shaft 5300. The connector 5400 may include a first connecting body 5410 and a second connecting body 5420.

The first connecting body 5410 may be a rectangular parallelepiped block. The first connecting body 5410 may connect the first link 4100 and the second block part 5120 of the moving block 5100. One end of the first connecting body 5410 may be rotatably coupled to the second block part 5120 of the moving block 5100.

The second connecting body 5420 may be disposed at an end of the first connecting body 5410 that is not coupled to the second block part 5120 of the moving block 5100. The second connecting body 5420 may be coupled to the rotating shaft 5300. The second connecting body 5420 may have a hollow ring shape. In this case, an inner surface of the second connecting body 5420 may have a shape corresponding to a shape of the rotating shaft 5300 to be engaged with the rotating shaft 5300. Thereby, when the first connecting body 5410 is rotated, the second connecting body 5420 may rotate the rotating shaft 5300.

Referring to FIGS. 3 and 4, the connector 5400 may be movable along an axial direction of the rotating shaft 5300.

Arrangement directions of the rotating shaft 5300 and the trigger 3100 are different from each other, but the moving directions of the moving block 5100 coupled to the trigger 3100 and the connector 5400 are the same. Further, since the rotating shaft 5300 is rotated in place inside the second housing body 5200, the rotating shaft 5300 may not move along the moving direction of the connector 5400. Accordingly, the connector 5400 moving in a direction different from the arrangement direction of the rotating shaft 5300 may move without pressing the rotating shaft 5300. That is, the connector 5400 movable along the axial direction of the rotating shaft 5300 may have an effect of minimizing wear of the rotating shaft 5300, and may be implemented as an indirect structure that allows the trigger 3100 to move smoothly.

Hereinafter, an operation process of the charging port opening and closing apparatus 1 for vehicles will be described.

FIGS. 6 to 8 are diagrams illustrating a process in which the charging gun is coupled to the charging port.

Referring to FIGS. 1 to 8, more specifically, referring to FIGS. 6 to 8, in a state where the charging gun G does not press the contact part 3110 of the trigger 3100, the first door 2100 and the second door 2200 are disposed at the first position P1 for closing the fast part 1220 of the charging port 1200, and the trigger 3100 is disposed at the second position P2 where the contact part 3110 protrudes outside the first door 2100 and the second door 2200.

In this state, when the charging gun G continuously presses the contact part 3110 of the trigger 3100 after the second pin part G2 of the charging gun G comes into contact with the contact part 3110 of the trigger 3100, as a pressing force is transmitted to the contact part 3110, the trigger 3100 is moved in a direction different from a direction in which the charging gun G presses the trigger 3100. More specifically, when a pressing force is transmitted to the contact part 3110 of the trigger 3100, the moving part 3120 of the trigger 3100 is moved in an inner space of the cylinder 3200 and the third coupling part 3130 disposed on the moving part 3120 of the trigger 3100 is moved in the same direction as a moving direction of the contact part 3110.

Thereby, the connector 5400 of the conversion unit 5000 coupled to the moving block 5100 may be moved in the same direction as a moving direction of the moving block 5100. At this time, the connector 5400 is moved along an axial direction of the rotating shaft 5300 that is rotated in place, and since the connector 5400 and the rotating shaft 5300 are engaged with each other, the connector 5400 may be moved along the axial direction of the rotating shaft 5300 while rotating the rotating shaft 5300.

When the rotating shaft 5300 is rotated in place by the connector 5400, the first link 4100 coupled to the rotating shaft 5300 is rotated in the same direction as a direction in which the rotating shaft 5300 is rotated. More specifically, the first link 4100 pushes the second link 4200 in a direction away from the trigger 3100 while being rotated around the rotating shaft 5300 as a rotation center. The second link 4200 pushed by the first link 4100 moves in the direction away from the trigger 3100 like the first link 4100.

When the second link 4200 is moved, the first door 2100 and the second door 2200 coupled to the second link 4200 are moved in the direction away from the trigger 3100. Thereby, the first door 2100 and the second door 2200 are disposed at the second position P2, and the fast part 1220 of the charging port 1200 is opened. At the same time, since the charging gun G continuously moves in the direction of pressing the contact part 3110 of the trigger 3100, the charging gun G may be finally coupled to the fast part 1220 of the charging port 1200.

As such, since the charging port opening and closing apparatus 1 for vehicles according to one embodiment of the present invention may open or close the charging port 1200 without direct contact of the user through the charging gun G, it is possible to secure a user's convenience and hygiene of vehicle charging.

According to one embodiment of the present invention, since there is no need for a user to directly remove a cover article such as a stopper covering a fast part of the charging port, it is possible to improve a user's convenience in manipulating a charging port.

Although the embodiments of the present invention have been described above, it is understood that one ordinary skilled in the art can make various changes and modifications to the present invention without departing from the spirit and scope of the present invention as hereinafter claimed. Further, it should be construed that differences associated with such changes and modifications fall within the scope of the present invention defined by the accompanying claims.

What is claimed is:

1. A charging port opening and closing apparatus for opening and closing a charging port coupled to a charging gun in a vehicle, the apparatus comprising:

- a door unit including a first door and a second door disposed in front of the charging port;
- a trigger unit including a trigger disposed at a position penetrating the first door and the second door;
- a link unit coupled to the first door and the second door configured to push or pull the first door and the second door while being rotated; and
- a conversion unit connecting the trigger and the link unit and configured to rotate the link unit while being rotated in conjunction with movement of the trigger.

2. The charging port opening and closing apparatus of claim 1, wherein the conversion unit includes:

- a moving block configured to move with the trigger;
- a rotating shaft configured to rotate in place; and a connector rotatably coupled to the moving block and configured to engage with the rotating shaft.

3. The charging port opening and closing apparatus of claim 2, wherein the connector is movable along an axial direction of the rotating shaft.

4. The charging port opening and closing apparatus of claim 1, comprising a cable housing in which the charging port is disposed, wherein the door unit includes a guide plate coupled to the cable housing and configured to moveably support the first door and the second door.

5. The charging port opening and closing apparatus of claim 4, wherein the cable housing includes a first groove configured to accommodate a portion of the trigger, wherein the first door includes a second groove, wherein the second door includes a third groove, and wherein the first groove, the second groove, and the third groove are disposed on a movement path of the trigger.

6. The charging port opening and closing apparatus of claim 2, wherein the moving block includes:

a first block part coupled to the trigger; and a second block part having a shape bent from an end of the first block part and rotatably supporting the connector.

7. The charging port opening and closing apparatus of claim 2, wherein the link unit includes:

a first link coupled to the rotating shaft of the conversion unit; and a second link connecting the first link and the first door and connecting the first link and the second door.

8. The charging port opening and closing apparatus of claim 2, comprising an elastic member disposed inside the trigger and compressed or decompressed according to movement of the trigger, wherein the first door and the second door close the charging port when a compressed state of the elastic member is released.

* * * * *